US009932068B2

(12) United States Patent
Oh (10) Patent No.: US 9,932,068 B2
(45) Date of Patent: Apr. 3, 2018

(54) INTEGRATED POWER STEERING SYSTEM FOR FRONT AND REAR WHEELS OF VEHICLE AND CONTROL METHOD THEREOF

(71) Applicant: Hyundai Motor Company, Seoul (KR)

(72) Inventor: Seung Hyun Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/960,995

(22) Filed: Dec. 7, 2015

(65) Prior Publication Data
US 2017/0072997 A1  Mar. 16, 2017

(30) Foreign Application Priority Data
Sep. 15, 2015 (KR) .................. 10-2015-0130122

(51) Int. Cl.
*B62D 5/06* (2006.01)
*B62D 5/09* (2006.01)
*B62D 15/02* (2006.01)
*B62D 7/14* (2006.01)
*B62D 7/15* (2006.01)

(52) U.S. Cl.
CPC .............. *B62D 5/063* (2013.01); *B62D 5/09* (2013.01); *B62D 7/144* (2013.01); *B62D 7/146* (2013.01); *B62D 7/159* (2013.01); *B62D 7/1563* (2013.01); *B62D 15/021* (2013.01)

(58) Field of Classification Search
CPC ......... B62D 5/063; B62D 5/09; B62D 15/021
See application file for complete search history.

(56) References Cited

U.S. PATENT DOCUMENTS 4,719,981 A * 1/1988 Miyoshi ............... B62D 7/1581
  180/412
4,836,319 A * 6/1989 Haseda .................. B62D 7/159
  180/412
(Continued)

FOREIGN PATENT DOCUMENTS

JP     H0569850 A     3/1993
JP     6-227418       8/1994
(Continued)

*Primary Examiner* — Jerrah Edwards
*Assistant Examiner* — Majdi Alsomiri
(74) *Attorney, Agent, or Firm* — Mintz Levin Cohn Ferris Glovsky and Popeo, P.C.; Peter F. Corless (57) ABSTRACT

A power steering system of a vehicle and a control method are provided. The system includes a main hydraulic motor that receives engine power and generates a hydraulic pressure and an auxiliary hydraulic motor that generates a hydraulic pressure. A front wheel steering cylinder receives hydraulic pressure and generates power for steering front wheels and auxiliary steering of a driver. A rear wheel steering cylinder receives hydraulic pressure and generates power for steering rear wheels. An integrated control valve connected to the hydraulic motors and the steering cylinders through hydraulic pressure pipelines, and adjusts the hydraulic pressure of a main hydraulic motor to supply the pressure to the front wheel steering cylinder and adjusts the hydraulic pressure generated of the auxiliary hydraulic motor to supply the pressure to the front or rear wheel steering cylinder.

7 Claims, 4 Drawing Sheets

(56) References Cited

U.S. PATENT DOCUMENTS

| | | | | |
|---|---|---|---|---|
| 4,862,366 A | * | 8/1989 | Morishita | B62D 5/049 180/446 |
| 4,878,556 A | * | 11/1989 | Wells | B62D 7/1509 180/414 |
| 4,934,474 A | * | 6/1990 | Sugasawa | B62D 7/148 180/404 |
| 4,979,115 A | * | 12/1990 | Takahashi | B62D 7/159 180/415 |
| 5,082,080 A | | 1/1992 | Kanazawa et al. | |
| 5,220,974 A | * | 6/1993 | Kim | B62D 7/1572 180/415 |
| 5,322,308 A | * | 6/1994 | Bishop | B62D 7/1536 180/414 |
| 5,526,895 A | * | 6/1996 | Shin | B60G 5/047 180/236 |
| 5,718,304 A | * | 2/1998 | Lee | B62D 7/1572 180/414 |
| 6,752,237 B2 | * | 6/2004 | Taneda | B62D 7/148 180/445 |
| 2015/0307128 A1 | * | 10/2015 | Blond | B62D 7/144 701/42 |

FOREIGN PATENT DOCUMENTS

| | | |
|---|---|---|
| JP | 10-258757 | 9/1998 |
| JP | 2998031 | 11/1999 |
| JP | 2006-69497 | 3/2006 |
| JP | 2006-327425 | 12/2006 |
| JP | 2013-107450 | 6/2013 |
| JP | 2015-9682 | 1/2015 |
| KR | 10-2010-0015055 A | 2/2010 |
| KR | 10-2012-0106211 | 9/2012 |

* cited by examiner

FIG. 1

RELATED ART

INTEGRATED POWER STEERING SYSTEM FOR FRONT AND REAR WHEELS OF VEHICLE AND CONTROL METHOD THEREOF

CROSS-REFERENCE TO RELATED APPLICATION

This application claims under 35 U.S.C. § 119(a) the benefit of Korean Patent Application No. 10-2015-0130122 filed on Sep. 15, 2015, which is incorporated by reference herein in its entirety.

BACKGROUND (a) Technical Field

The present disclosure relates to a power steering system of a vehicle and a control method thereof, and more particularly, to an integrated power steering system for front and rear wheels that reduces the number of components, manufacturing costs, and power loss of a vehicle using components together, such as a hydraulic pump, a controller, and a control valve, which are used in an emergency steering system and a rear wheel steering system, and a control method thereof.

(b) Description of the Related Art

As generally known in the art, a steering system is an apparatus that is configured to convert a progress direction of a vehicle being driven based on the intention of the driver. In recent years, many vehicles have used a steering system that may assist power for a steering force of the driver, that is, a power steering system that may reduce a steering wheel manipulating force of a driver to allow a light and prompt steering operation.

Among the power steering systems, a hydraulic power steering (HPS) system uses a hydraulic pressure to generate power for assisting a steering force of the driver, that is, an auxiliary steering force. As a power steering system that uses an electronic control unit (ECU), an electronic power steering (EPS) system that adjusts the degree of assistance by adding a control valve that adjusts a hydraulic pressure to an existing hydraulic power steering system is known.

Basically, a hydraulic power steering system uses a hydraulic force, and accordingly, includes a hydraulic pump configured to generate a hydraulic pressure. Furthermore, power for assisting a steering force of the driver is generated by supplying a hydraulic pressure generated by the hydraulic pump and adjusted by a control valve to a steering actuator, that is, a steering cylinder, and then a mechanical hydraulic pump that mainly receives engine power by a power transmission mechanism such as a belt and a pulley is used as the hydraulic pump. In addition, an electro hydraulic power steering (EHPS) system that assists a steering force using an electric hydraulic pump operated by a motor is known.

Meanwhile, when the operation of an engine is stopped or a hydraulic pump breaks down (e.g., fails) while the vehicle is driven causing a hydraulic pressure to not be supplied to a steering cylinder, a power assistant function of the power steering system may become invalid. In particular, since the driver should manipulate the steering wheel with the driver's force while power is not assisted, the steering wheel may be difficult to manipulate, leading to the risk of an accident. Accordingly, an electric auxiliary hydraulic pump operated by a motor is additionally provided for emergency steering separately from a mechanical main hydraulic pump operated by an engine, and in an emergency situation in which an operation of the engine is stopped or a main hydraulic pump fails, the auxiliary hydraulic pump is operated to supply a hydraulic pressure to a steering cylinder, preventing an accident.

In particular, in the commercial vehicles including middle and large scale trucks, maximum steering force when the power steering systems fail is limited by rules, and when the power steering systems are not operated due to a failure, an emergency steering function should be provided that allows driving a predetermined distance using an auxiliary hydraulic pump. To satisfy the rules, an additional apparatus for assisting steering force when the power steering system fails is provided in many the two-axle commercial vehicles, and the steering system including the apparatus is generally referred to as an emergency steering system.

The emergency steering systems mainly applied to commercial vehicles are classified into a main hydraulic circuit operated by power of an engine in a normal situation, and an auxiliary hydraulic circuit operated by power of a motor in an emergency such as a failure of the main hydraulic circuit. In particular, the emergency steering system includes an oil reservoir in which oil is stored, a main hydraulic pump that is a mechanical hydraulic pump driven by an engine, an auxiliary hydraulic pump that is an electric hydraulic pump driven by a motor (Motor Pmp Unit: MPU), a control valve configured to adjust the supply of a hydraulic pressure, a steering cylinder configured to receive a hydraulic pressure adjusted by the control valve and generate power for assisting steering, a gearbox for steering of front wheels, and a controller (electronic control unit: ECU) that configured to operate the steering system.

Accordingly, an electric hydraulic pump is added to configure an emergency steering system, and a hydraulic pipeline is also added. In a brief description of an operation of the emergency steering system, when the controller detects a failure of the main hydraulic circuit, that is, a failure of the main hydraulic pump driven by the engine while the vehicle is driven, the electric auxiliary hydraulic pump is driven. Then, a hydraulic pressure is generated by driving of the auxiliary hydraulic pump, and the steering cylinder that has received the hydraulic pressure is driven to generate an emergency steering force.

The emergency steering system including the auxiliary hydraulic pump is mounted on the vehicle as a front wheel steering system for steering of front wheels, and in addition to the above-described configuration, a steering angle sensor (SAS) that detects a steering angle (e.g., the angle of the steering wheel) according to a steering wheel manipulation state of the driver such that auxiliary steering according to a steering input of the driver, that is, a steering wheel manipulation state may be further included.

Meanwhile, a rear wheel steering system by which a rearmost axle may be steered based on an application of a long wheel base and multiple axles is necessary in a large scale commercial vehicle. A hydraulic system that employs a hydraulic pump and a steering cylinder is also mainly applied to the rear wheel steering system. The rear wheel steering system includes a hydraulic pump configured to generate and supply a hydraulic pressure, a control valve configured to adjust a hydraulic pressure, a rear wheel steering cylinder configured to receive a hydraulic pressure and generate power for steering of rear wheels, and a controller (ECU) configured to operate the rear wheel steering system.

In vehicles to which the rear steering system is applied, an electric hydraulic pump (MPU) operated by a motor is mainly used as a hydraulic pump. In addition, in a vehicle on which the rear wheel steering system is mounted, since the angle of the rear wheels steered based on the vehicle speed and the angle of the front wheels is adjusted, an amount of wear of the tires may be optimized by reducing a minimum radius of rotation of the vehicle and uniformly distributing transverse forces applied to the tires. Thus, in addition to a speed sensor, a front wheel angle sensor configured to detect the angle of front wheels and a rear wheel angle sensor configured to detect the angle of rear wheels my be used.

Figure 1:
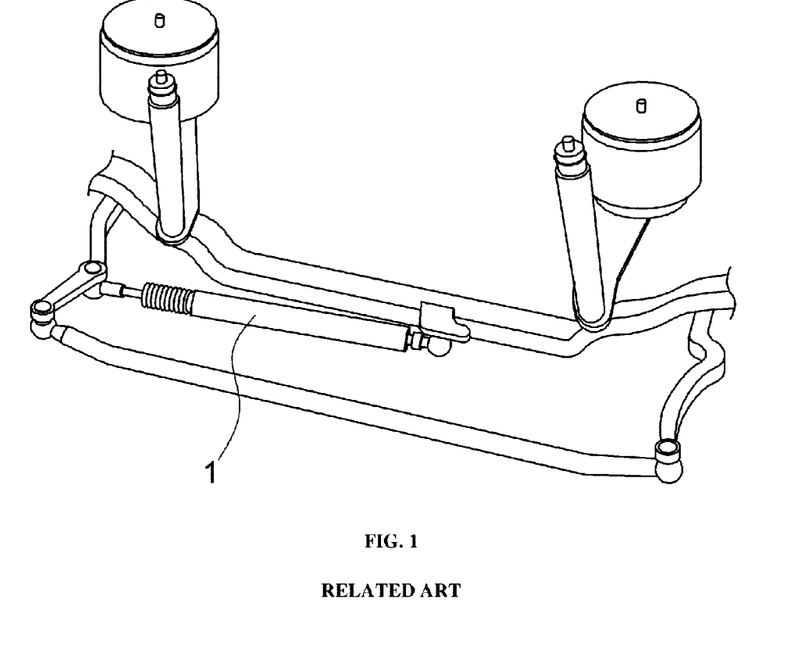
FIG. 1 is a perspective view illustrating main components of a rear wheel steering system including a rear axle and a steering cylinder according to the related art.

FIG. 1 is a perspective view illustrating main components of a rear wheel steering system including a rear axle and a steering cylinder according to the related art. In particular, reference numeral 1 denotes a rear wheel steering cylinder. In a description of an operation of the rear wheel steering system, when the angle of the front wheels and the vehicle speed are detected by the front wheel angle sensor and the speed sensor, the controller is configured to determine a targeted angle of the rear wheels from the angle of the front wheels and the vehicle speed that have been detected, and operate the electric hydraulic pump and the control valve to adjust the determined angle of the rear wheels.

Accordingly, the hydraulic pressure generated through driving of the electric hydraulic pump is supplied to the rear wheel steering cylinder 1 that is an actuator for steering of the rear wheels through the control valve, and then the rear wheels are steered through an operation of the rear wheel steering cylinder 1. Further, in a vehicle on which both the emergency steering system that performs steering of the front wheels and emergency steering and the rear wheel steering system that performs steering of the rear wheels are mounted, the hydraulic pump, the control valve, and the controller of the rear wheel steering system may be provided separately, together with the main hydraulic pump, the auxiliary hydraulic pump, the control valve, and the controller of the emergency steering system.

In particular, both the auxiliary hydraulic pump of the emergency steering system and the hydraulic pump of the rear wheel steering system employs electric hydraulic pumps, and although the auxiliary hydraulic pump of the emergency steering system is a hydraulic pump that is not used in a normal situation but is used only in an emergency such as a failure of the main hydraulic pump, the auxiliary hydraulic pump and the hydraulic pump of the rear wheel steering system are provided separately.

Accordingly, the number of the components of the steering system of the vehicle on which both the emergency steering system and the rear wheel steering system are mounted is excessive, and loss of power of the vehicle is excessive and manufacturing costs may increase.

SUMMARY

Accordingly, the present invention provides an integrated power steering system for front and rear wheels that may reduce the number of components, reduce manufacturing costs, and reduce power loss of a vehicle by using components together (e.g., integrating components), such as a hydraulic pump, a controller, and a control valve, used in an emergency steering system and a rear wheel steering system. The present invention also provides a control method that may appropriately operate an emergency steering function and a rear wheel steering function based on situations in a system using components together.

In accordance with an aspect of the present invention, an integrated power steering system for front and rear wheels of a vehicle may include: a main hydraulic motor configured to receive power of an engine to be driven, and generate a hydraulic pressure; an auxiliary hydraulic motor configured to generate a hydraulic pressure; a front wheel steering cylinder configured to receive a hydraulic pressure and generate power for steering of front wheels and auxiliary steering of a driver; a rear wheel steering cylinder configured to receive a hydraulic pressure and generate power for steering of rear wheels; an integrated control valve connected to the hydraulic motors and the steering cylinders through hydraulic pressure pipelines, and configured to adjust a hydraulic pressure generated by a main hydraulic motor to supply the adjusted hydraulic pressure to the front wheel steering cylinder and adjust a hydraulic pressure generated by the auxiliary hydraulic motor to supply the adjusted hydraulic pressure to any one of the front wheel steering cylinder and the rear wheel steering cylinder; and a controller configured to operate the auxiliary hydraulic motor and the integrated control valve to supply the hydraulic pressure generated by the main hydraulic motor to the front wheel steering cylinder or to supply the hydraulic pressure generated by the auxiliary hydraulic motor to any one of the front wheel steering cylinder and the rear wheel steering cylinder when the driver manipulates the steering wheel.

In accordance with another aspect of the present invention, a control method of an integrated power steering system for front and rear wheels may include: a main hydraulic motor configured to receive power of an engine to be driven, and generate a hydraulic pressure; an auxiliary hydraulic motor that generates a hydraulic pressure; a front wheel steering cylinder configured to receive a hydraulic pressure and generate power for steering of front wheels and auxiliary steering of a driver; a rear wheel steering cylinder configured to receive a hydraulic pressure and generate power for steering of rear wheels; an integrated control valve connected to the hydraulic motors and the steering cylinders through hydraulic pressure pipelines; and a controller configured to operate the auxiliary hydraulic motor and the integrated control valve.

In particular, the control method may include: determining whether the main hydraulic motor fails; when the main hydraulic motor fails, operating the integrated control valve to supply a hydraulic pressure generated by the auxiliary hydraulic motor to the front wheel steering cylinder when the driver manipulates the steering wheel; and when the main hydraulic motor is in a normal state (e.g., no failure), adjusting a hydraulic pressure generated by the main hydraulic motor to supply the adjusted hydraulic pressure to the front wheel steering cylinder, and adjusting a hydraulic pressure generated by the auxiliary hydraulic motor to supply the adjusted hydraulic pressure to the rear wheel steering cylinder when the driver manipulates the steering wheel.

Accordingly, an integrated power steering system for front and rear wheels and a control method thereof may reduce the number of components, reduce manufacturing costs, and reduce power loss of a vehicle by using components together, such as a hydraulic pump, a controller, and a control valve, used in an emergency steering system and a rear wheel steering system Furthermore, the vehicle to which the present invention is applied may achieve effects, such as improvement of the wear property of tires, reduction of a minimum radius of rotation of the vehicle, improvement of a convenience of parking, and dealing with the emergency steering related rules, which are achieved by the functions of emergency steering and steering of rear wheels through a simplified configuration, and may contribute to improvement of the product value of the vehicle. In addition, power consumption may be reduced since the number of electric components, such as a controller and control valve including an auxiliary hydraulic pump that is an electric hydraulic pump, may be reduced and in particular, the capacities of an alternator and a battery may be reduced since the number of electric hydraulic pump may be reduced.

BRIEF DESCRIPTION OF THE DRAWINGS

The above and other features of the present invention will now be described in detail with reference to exemplary embodiments thereof illustrated by the accompanying drawings which are given herein below by way of illustration only, and thus are not limitative of the present invention, and wherein.

It should be understood that the appended drawings are not necessarily to scale, presenting a somewhat simplified representation of various features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an embodiment of the present invention will be described with reference to the accompanying drawings so that those skilled in the art to which the present invention pertains may easily carry out the present invention.

The present invention provides a power steering system for front and rear wheels that may reduce the number of components, reduce manufacturing costs, and reduce power loss of a vehicle by using components together, such as a hydraulic pump, a controller, and a control valve, used in an emergency steering system and a rear wheel steering system. The present invention also provides a control method that may appropriately operate and control an emergency steering function and a rear wheel steering function according to situations in a system using components together.

Figure 2:
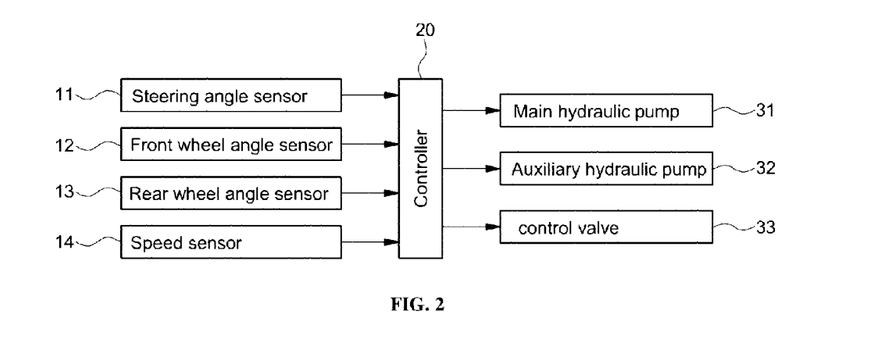
FIG. 2 is a block diagram illustrating main components of an integrated power steering system for front and rear wheels according to an exemplary embodiment of the present invention.
Figure 3:
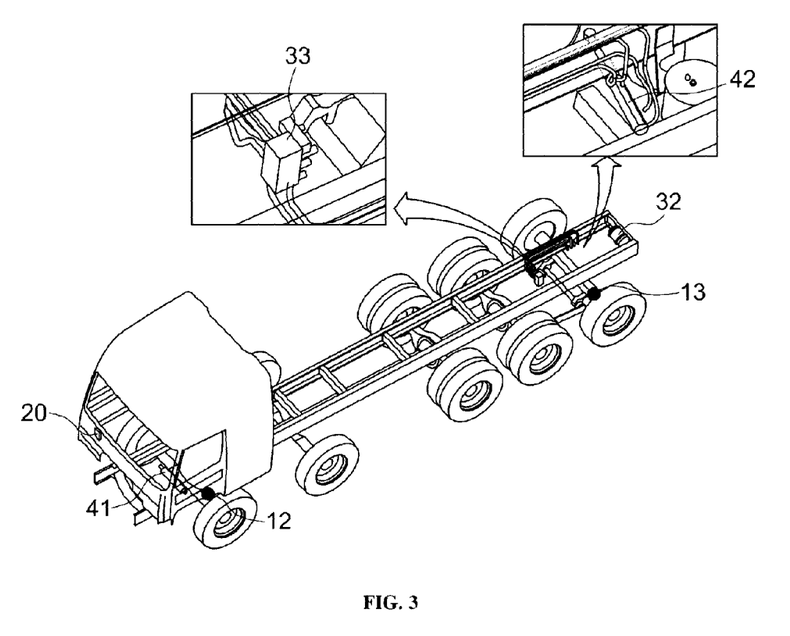
FIG. 3 is a view schematically illustrating an installation state of the main components of the power steering system for front and rear wheels according to exemplary the embodiment of the present invention.

FIG. 2 is a block diagram illustrating main components of an integrated power steering system for front and rear wheels according to an exemplary embodiment of the present invention. FIG. 3 is a view schematically illustrating an installation state of the main components of the power steering system for front and rear wheels according to the exemplary embodiment of the present invention. According to the present invention, an auxiliary hydraulic pump 32 of an emergency steering system may also be used as a hydraulic pump for steering of rear wheels used in a rear wheel steering system.

In other words, hydraulic pumps configured to generate a hydraulic pressure may include a normally used main hydraulic pump 31 and an auxiliary hydraulic pump 32 used in an emergency situation, and the auxiliary hydraulic pump 32 may be used as a hydraulic pump configured to generate a hydraulic pressure for steering of rear wheels. Furthermore, the present invention commonly uses existing controllers that should be provided for respective systems using an integrated controller 20 that may execute a steering operation of front wheels (e.g., assisting a steering operation of the driver), an emergency steering operation (assisting a steering operation of the driver for front wheels), and a steering operation of rear wheels.

According to the exemplary embodiment of the present invention, the main hydraulic pump 31 may be a mechanical hydraulic pump that is driven by an engine of the vehicle, and the main hydraulic pump 31 may be connected to the engine through a power transmission mechanism, such as a belt and a pulley, to receive power from the engine. The auxiliary hydraulic pump 32 may be an electric hydraulic pump (MPU) driven by a motor, and the driving of the motor may be executed based on a control signal of a controller 20 to adjust the driving of a pump for generating a hydraulic pressure.

Furthermore, according to the present invention, an integrated control valve 33 configured to adjust the supply of a hydraulic pressure for steering of front wheels, an emergency steering operation, and steering of rear wheels based on a control signal of the controller 20 may be used. The integrated control valve 33 may be configured to adjust the supply of a hydraulic pressure to supply a hydraulic pressure generated by the main hydraulic pump 31 that is operated normally (e.g., without failure) to a front wheel steering cylinder 41 corresponding to an actuator for steering of front wheels during steering by the driver, and also may be configured to adjust the supply of a hydraulic pressure to selectively supply a hydraulic pressure generated by the auxiliary hydraulic pump 32 to any one of the front wheel steering cylinder 41 and the rear wheel steering cylinder 42.

The normal state indicates that the main hydraulic circuit in which the main hydraulic pump 31 does not fail is operated normally, and that during steering by the driver (e.g., when the steering wheel is manipulated), a hydraulic pressure generated through driving of the main hydraulic pump 31 generates power for assisting steering and thus, steering of the front wheels and auxiliary steering may be performed normally. In an emergency situation, the main hydraulic circuit may not be operated normally due to a failure of the main hydraulic pump 31 or the like thus preventing auxiliary steering by the main hydraulic circuit from being performed, and steering of the front wheels and auxiliary steering should be performed using the auxiliary hydraulic pump 32 instead of using the main hydraulic pump 31 when the steering wheel is manipulated.

Furthermore, the power steering system for front and rear wheels according to the exemplary embodiment of the present invention may include an oil reservoir 9 in which oil is stored, a gearbox (not illustrated) for steering of the front wheels, steering cylinders 41 and 42 configured to receive a hydraulic pressure to generate power for auxiliary steering, other known sensors, and a hydraulic pressure pipeline that connects the oil reservoir 9, the main hydraulic pump 31, the auxiliary hydraulic pump 32, a control valve 33, and the steering cylinders 41 and 42.

In particular, the oil reservoir 9, the gearbox, the steering cylinders 41 and 42, and the sensors are not different from those of the related art, and the steering cylinders include a front wheel steering cylinder 41 configured to generate power for steering of the front wheels and auxiliary steering and a rear wheel steering cylinder 42 configured to generate power for steering of the rear wheels. The front wheel steering cylinder 41 may be used for steering of the front wheels and auxiliary steering in normal and emergency situations, and may be configured to receive a hydraulic pressure generated by the main hydraulic pump 31 through the control valve 33 in a normal situation and receive a hydraulic pressure generated by the auxiliary hydraulic pump 32 through the control valve 33 in an emergency situation.

The rear wheel steering cylinder 42 may be used for steering of the rear wheels in a normal situation, and as will be described below, in a normal state in which the main hydraulic pump 31 and the like do not fail, when the vehicle speed detected by a speed sensor 14 is a preset reference vehicle speed or less (e.g., a low speed driving state), the rear wheel steering cylinder 42 may be configured to receive a hydraulic pressure generated by the auxiliary hydraulic pump 32 corresponding to a common pump through the control valve 33. In other words, steering of the rear wheels by the rear wheel steering cylinder 42 may be performed only in a normal state of the power steering system and a state in which the vehicle is driven at a low speed.

Furthermore, one integrated control valve 33 may be operated based on a control signal output from the controller 20 to adjust a hydraulic pressure supplied from the main hydraulic pump 31 to the front wheel steering cylinder 41 when the driver performs steering in a normal state of the power steering system. In particular, the adjustment of a hydraulic pressure supplied to the front wheel steering cylinder 41 by the control valve 33 is not different from the related art.

Meanwhile, according to the present invention, the integrated control valve 33 may be operated based on a control signal output from the controller 20 in a normal state of the power steering system and a low speed driving state to supply a hydraulic pressure generated by the auxiliary hydraulic pump 32 to the rear wheel steering cylinder 42, and then the adjusted hydraulic pressure may be supplied to the rear wheel steering cylinder 42. In contrast, the integrated control valve 33 may be operated by a control signal output from the controller 20 to supply a hydraulic pressure generated by the auxiliary hydraulic pump 32 to the front wheel steering cylinder 41 while the driver performs steering in an emergency situation, and then the adjusted hydraulic pressure may be supplied to the front wheel steering cylinder 41.

Figure 4:
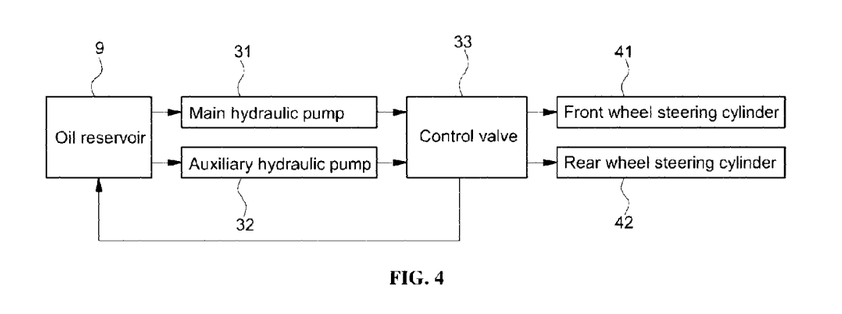
FIG. 4 is a hydraulic circuit diagram schematically illustrating an connection state of hydraulic pressure pipelines of the main components of the power steering system for front and rear wheels according to the exemplary embodiment of the present invention.

Furthermore, according to the present invention, the hydraulic pressures supplied to the front wheel steering cylinder 41 and the rear wheel steering cylinder 42 may be adjusted using one integrated control valve 33, and to achieve this, as illustrated in FIG. 4, the control valve 33 may be disposed on a hydraulic pressure path between the hydraulic pumps 31 and 32 and the steering cylinders 41 and 42.

FIG. 4 is a hydraulic circuit diagram schematically illustrating a connection state of hydraulic pressure pipelines of the main components of the power steering system for front and rear wheels according to the exemplary embodiment of the present invention. As illustrated, the main hydraulic pump 31 and the auxiliary hydraulic pump 32 may be configured to pump the oil stored in the oil reservoir 9. Then, the control valve 33 may be connected to the main hydraulic pump 31, the auxiliary hydraulic pump 32, the front wheel steering cylinder 41, and the rear wheel steering cylinder 42 through hydraulic pressure pipelines.

Meanwhile, the sensors may include a steering angle sensor (SAS) 11 configured to detect a steering angle (e.g., an angle of the steering wheel) to assist steering of the front wheels based on a steering input of the driver, that is, a steering wheel manipulation state. Furthermore, a speed sensor 14 may be configured to detect the speed of the vehicle to adjust steering of the rear wheels, a front wheel angle sensor 12 configured to detect the angle of front wheels, and a rear wheel angle sensor 13 configured to detect the angle of the rear wheels.

The detection signals of the sensors 11, 12, 13, and 14 may be input to the controller 20, and the controller 20 may be configured to output control signals in response thereto to adjust steering of the front wheels, steering of the rear wheels, and emergency steering based on the detection information detected by the sensors. As a result, an operation of the auxiliary hydraulic pump 32 and an operation of the control valve 33 may be executed by the controller 20 to thus perform steering of the front wheels, steering of the rear wheels, and emergency steering.

Figure 5:
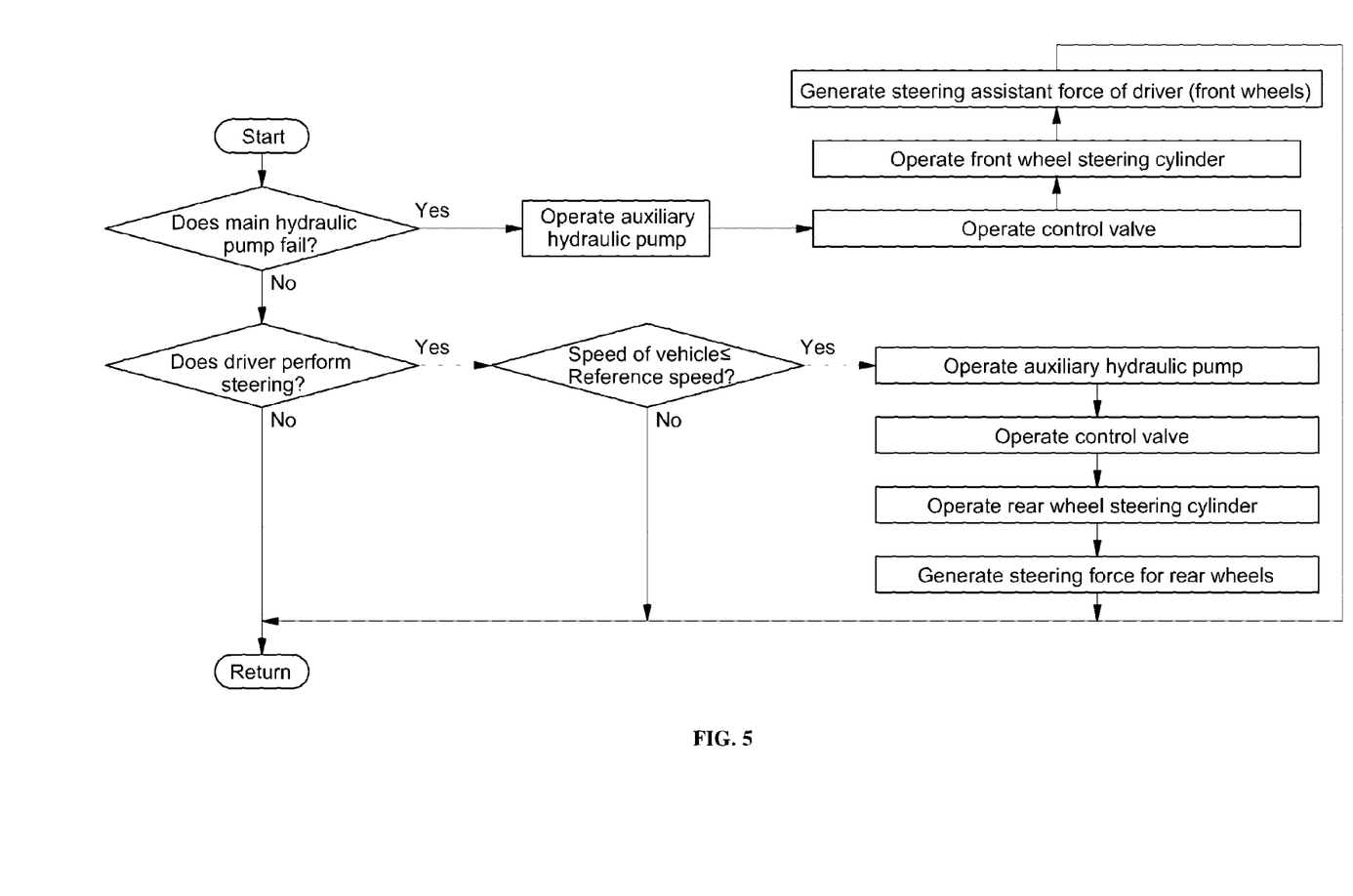
FIG. 5 is a flowchart illustrating a control process according to an exemplary embodiment of the present invention.

Hereinafter, a control method according to the present invention will be described with reference to FIG. 5. FIG. 5 illustrates a process of selectively performing emergency steering (e.g., assisting a steering force of the driver) and steering of the rear wheels based on a failure of the main pump and the vehicle speed, but although not illustrated, steering of the front wheels may be performed when the rear wheels are steered.

First, the controller 20 may be configured to diagnose and detect a failure of the main hydraulic pump 31 driven by the engine based on a predetermined failure diagnosis logic and in response to determining a failure of the main hydraulic pump 31 based on a failure diagnosis result while the vehicle is driven, the controller may be configured to perform a control process for emergency steering and auxiliary steering for the front wheels. In other words, the controller 20 may be configured to operate an electric hydraulic pump driven by the motor, that is, the auxiliary hydraulic pump 32, and output a control signal for steering of the front wheels and auxiliary steering that corresponds to the manipulation of the steering wheel by the driver using a hydraulic pressure generated by the auxiliary hydraulic pump 32.

Then, the controller 20 may be configured to output a control signal for steering of the front wheels and auxiliary steering based on a detection value of the steering angle sensor 11 as in general emergency steering for the front wheels. Accordingly, the control valve 33 may be operated based on a control signal output from the controller 20 to supply a hydraulic pressure generated by the auxiliary hydraulic pump 32 to the front wheel steering cylinder 41, and the hydraulic pressure supplied may then be adjusted to a value that corresponds to a driver steering input, that is, the manipulation of the steering wheel.

As a result, the front wheel steering cylinder 41 may be configured to receive a hydraulic pressure adjusted using the control valve 33 to generate power (e.g., a steering assisting force) that corresponds to the manipulation of the steering wheel of the driver, and the front wheels in an emergency situation may be steered while the angle of the front wheels is adjusted by the power of the front wheel steering cylinder 41. Further, when a normal state instead of a failure of the main hydraulic pump 31 is determined in the failure diagnosis process, the controller may be configured to determine whether the vehicle speed detected by the speed sensor 14 is a reference speed or less while the driver performs a steering operation.

Particularly, when the vehicle is driven in a low speed state that corresponds to a reference speed or less, the front wheels and the rear wheels may be operated together, and when the vehicle is driven at a speed greater than the reference speed, only the front wheels may be operated. In other words, when the vehicle is driven at a speed that corresponds to the reference speed or less, the controller 20 may be configured to output a control signal for steering of the front wheels and auxiliary steering that corresponds to the manipulation of the steering wheel of the driver using a hydraulic pressure generated by the main hydraulic pump 31 and output a control signal for steering of the rear wheels that corresponds to the angle of the front wheels and the vehicle speed using a hydraulic pressure generated by the auxiliary hydraulic pump 32 at the same time.

In steering of the front wheels, the controller 20 may be configured to operate the control valve 33 by the control signal to adjust a hydraulic pressure of the main hydraulic pump 31 driven by the engine to a value that corresponds to the manipulation of the steering wheel of the driver and to supply the adjusted pressure to the front wheel steering cylinder 41. Then, the controller 20 may be configured to adjust a hydraulic pressure supplied to the front wheel steering cylinder 41 using the control valve 33 based on a detection value of the steering angle sensor 11 as in general steering of front wheels, and accordingly, steering of front wheels and auxiliary steering that correspond to the manipulation of the steering wheel of the driver may be performed.

Additionally, the controller 20 may be configured to output the control signal for steering of the rear wheels to drive the auxiliary hydraulic pump 32, and adjust a hydraulic pressure supplied from the auxiliary hydraulic pump 32 to the rear wheel steering cylinder 42 to adjust the angle of the rear wheels to an angle that corresponds to the angle of the front wheels and the vehicle speed by operating the control valve 33 using the control signal. Then, the controller 20 may be configured to determine a targeted angle of the rear wheels based on the detection values of the front wheel angle sensor 12 and the speed sensor 14, and operate the control valve 33 to steer the rear wheels to the determined angle of the rear wheels. In particular, the controller 20 may be configured to operate the control valve 33 to match the detection value of the rear wheel angle sensor with the targeted value while the determined angle of the rear wheels act as the targeted value, to adjust a hydraulic pressure supplied to the rear wheel steering cylinder 42.

Figure 6:
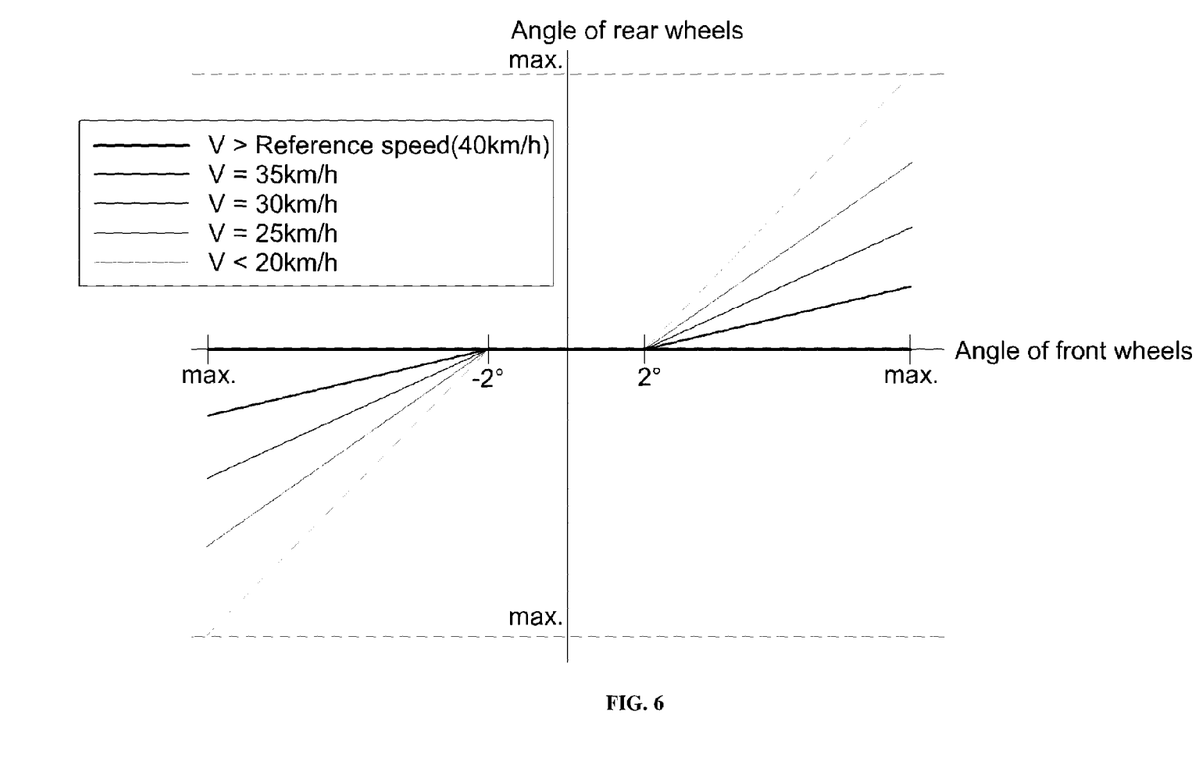
FIG. 6 is a view illustrating an example of setting a targeted angle of a rear wheel according to the angle of a front wheel and the speed of a vehicle for steering of the rear wheel according to an exemplary embodiment of the present invention.

FIG. 6 is a view illustrating an example of setting a targeted angle of a rear wheel according to the angle of a front wheel and the speed of a vehicle for steering of the rear wheel according to an exemplary embodiment of the present invention. In particular, since the angle of the rear wheels steered based on the vehicle speed and the angle of the front wheels may be adjusted, an amount of wear of the tires may be optimized by reducing a minimum radius of rotation of the vehicle and uniformly distributing transverse forces applied to the tires.

Furthermore, when the vehicle is driven at a speed greater than a reference speed while the driver performs a steering operation in a normal operation state of the main hydraulic pump 31, the controller 20 may be configured to allow a hydraulic pressure generated by the hydraulic pump 31 to be supplied to the front wheel steering cylinder 41 using the control valve 33 while the driving of the auxiliary hydraulic pump 32 is stopped to adjust steering and auxiliary steering only for the front wheels, and a hydraulic pressure control process for steering of the front wheels and auxiliary steering is as described above.

Accordingly, an integrated power steering system for front and rear wheels and a control method thereof may reduce the number of components, reduce manufacturing costs, and reduce power loss of a vehicle by using components together, such as a hydraulic pump, a controller, and a control valve, used in an emergency steering system and a rear wheel steering system. Furthermore, the vehicle to which the present invention is applied may achieve effects, such as improvement of the wear property of tires, reduction of a minimum radius of rotation of the vehicle, improvement of a convenience of parking, and dealing with the emergency steering related rules, which are achieved by the functions of emergency steering and steering of rear wheels through a simplified configuration, and may contribute to improvement of the product value of the vehicle. In addition, power consumption may be reduced since the number of electric components, such as a controller and control valve including an auxiliary hydraulic pump that is an electric hydraulic pump, may be reduced and in particular, the capacities of an alternator and a battery may be reduced since the number of electric hydraulic pump may be reduced.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An integrated power steering system for front and rear wheels of a vehicle, comprising:
   a main hydraulic pump configured to receive power of an engine to be driven, and generate a hydraulic pressure;
   an auxiliary hydraulic pump configured to generate a hydraulic pressure;
   a front wheel steering cylinder configured to receive hydraulic pressure and generate power for steering of front wheels and auxiliary steering of a driver;
   a rear wheel steering cylinder configured to receive hydraulic pressure and generate power for steering of rear wheels;
   an integrated control valve connected to the hydraulic pumps and the steering cylinders through hydraulic pressure pipelines, and configured to adjust the hydraulic pressure generated by the main hydraulic pump to supply the adjusted hydraulic pressure to the front wheel steering cylinder and adjust the hydraulic pressure generated by the auxiliary hydraulic pump to supply the adjusted hydraulic pressure to any one of the front wheel steering cylinder and the rear wheel steering cylinder;
   a controller configured to operate the auxiliary hydraulic pump and the integrated control valve to supply the hydraulic pressure generated by the main hydraulic pump to the front wheel steering cylinder and to supply the hydraulic pressure generated by the auxiliary hydraulic pump to any one of the front wheel steering cylinder and the rear wheel steering cylinder when the steering wheel is manipulated; and
   a speed sensor configured to detect a driving speed of the vehicle,
   wherein when the main hydraulic pump is in a normal state and the vehicle speed detected by the speed sensor while the steering wheel is manipulated is a reference speed or less, the controller is configured to operate the auxiliary hydraulic pump to the front wheel steering cylinder and supply the hydraulic pressure generate by the auxiliary hydraulic pump to the rear wheel steering cylinder.

2. The integrated power steering system of claim 1, wherein the auxiliary hydraulic pump is an electric hydraulic pump driven by a motor.

3. The integrated power steering system of claim 1, wherein when a failure of the main hydraulic pump is determined, the controller is configured to operate the auxiliary hydraulic pump when the steering wheel is manipulated, and operate the integrated control valve to supply the hydraulic pressure generated by the auxiliary hydraulic pump to the front wheel steering cylinder.

4. The integrated power steering system of claim 1, wherein when the main hydraulic pump is in a normal state and the vehicle speed detected by the speed sensor is greater than the reference vehicle speed while the steering wheel is manipulated, the controller is configured to stop operating the auxiliary hydraulic pump and is configured to operate the integrated control valve to supply the hydraulic pressure generated by the main hydraulic pump to the front wheel steering cylinder.

5. A control method of an integrated power steering system for front and rear wheels comprising: a main hydraulic pump configured to receive power of an engine to be driven, and generate a hydraulic pressure; an auxiliary hydraulic pump configured to generate a hydraulic pressure; a front wheel steering cylinder configured to receive hydraulic pressure and generate power for steering of front wheels and auxiliary steering of a driver; a rear wheel steering cylinder configured to receive hydraulic pressure and generate power for steering of rear wheels; an integrated control valve connected to the hydraulic pumps and the steering cylinders through hydraulic pressure pipelines; and a controller configured to operate the auxiliary hydraulic pump and the integrated control valve, the control method comprising:
   determining, by the controller, whether the main hydraulic pump fails;
   in response to detecting the failure, operating, by the controller, the integrated control valve to supply the hydraulic pressure generated by the auxiliary hydraulic pump to the front wheel steering cylinder while the steering wheel is manipulated; and
   when the main hydraulic pump is in a normal state, adjusting, by the controller, the hydraulic pressure generated by the main hydraulic pump to supply the adjusted hydraulic pressure to the front wheel steering cylinder, and adjusting the hydraulic pressure generated by the auxiliary hydraulic pump to supply the adjusted hydraulic pressure to the rear wheel steering cylinder while the steering wheel is manipulated,
   wherein when the main hydraulic pump is in the normal state and the speed of the vehicle is a reference speed or less while steering wheel is manipulated, the hydraulic pressure generated by the main hydraulic pump is adjusted to supply the adjusted hydraulic pressure to the front wheel steering cylinder, and the hydraulic pressure generated by the auxiliary hydraulic pump is adjusted to supply the adjusted hydraulic pressure to the rear wheel steering cylinder.

6. The control method of claim 5, wherein when the hydraulic main pump is in the normal state and the vehicle speed detected by the speed sensor is greater than the reference vehicle speed while the steering wheel is manipulated, the driving of the auxiliary hydraulic pump is stopped and the integrated control valve is operated to supply the hydraulic pressure generated by the main hydraulic pump to the front wheel steering cylinder.

7. The control method of claim 5, wherein an angle of front wheels is detected by a front wheel angle sensor, a targeted angle of rear wheels are determined from the speed of the vehicle detected by a speed sensor, and a control valve for adjusting the hydraulic pressure supplied to the rear wheel steering cylinder is performed to steer the rear wheels to the determined angle of the rear wheels.

* * * * *